April 8, 1958  E. E. GILBERT ET AL  2,830,083
PRODUCTION OF ARYLOXY ALIPHATIC CARBOXYLIC ACIDS
Filed April 29, 1953
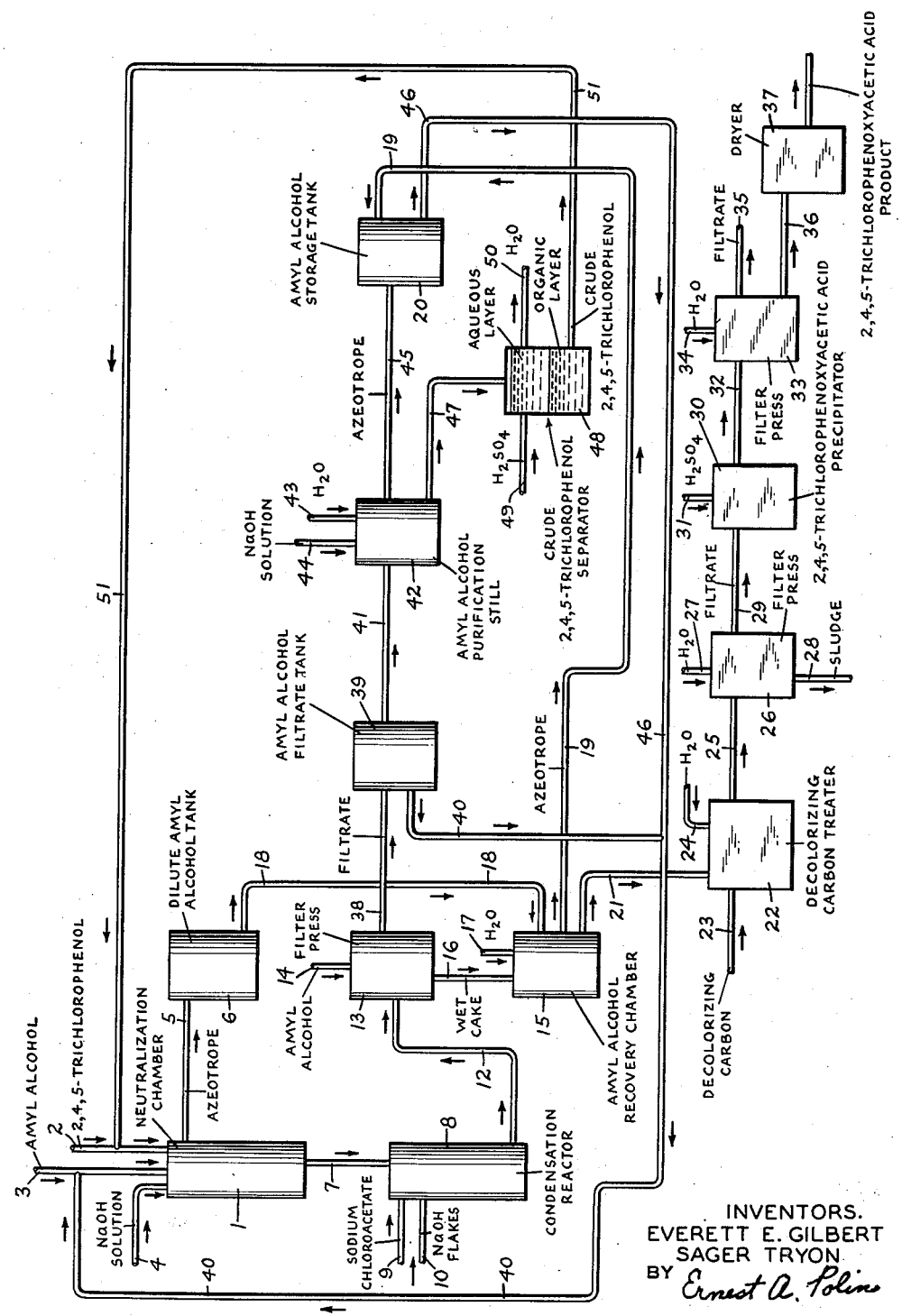
INVENTORS.
EVERETT E. GILBERT
SAGER TRYON
BY Ernest A. Polino
ATTORNEY.

2,830,083

PRODUCTION OF ARYLOXY ALIPHATIC CARBOXYLIC ACIDS

Everett E. Gilbert, Flushing, N. Y., and Sager Tryon, Claymont, Del., assignors to Allied Chemical & Dye Corporation, New York, N. Y., a corporation of New York Application April 29, 1953, Serial No. 351,944

10 Claims. (Cl. 260—521)

This invention relates to the production of aryloxy aliphatic carboxylic acids useful as plant growth regulants and weed killers, and more particularly concerns an improved method for the production of aryloxy aliphatic carboxylic acids by condensation reaction between salts of a phenol and of a chloroaliphatic carboxylic acid.

In the conventional manner of preparing aryloxy aliphatic carboxylic acids, an aqueous solution of alkali metal salts of a phenol and of a chloroaliphatic carboxylic acid is heated to form an alkali metal salt of an aryloxy aliphatic carboxylic acid, which salt is then converted to the free acid by the addition of a mineral acid. The reaction may be illustrated by the formation of 2,4-dichlorophenoxyacetic acid from the sodium salts of 2,4-dichlorophenol and monochloroacetic acid:

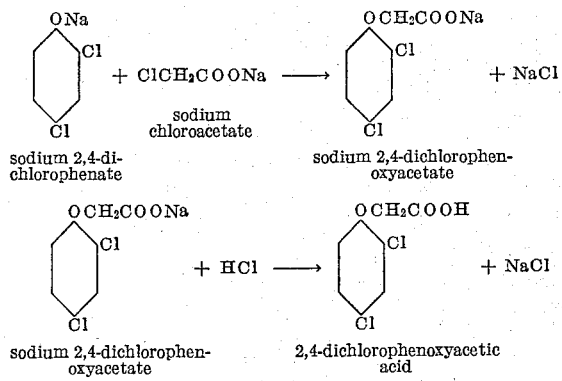

A major source of yield loss in the condensation reaction described above occurs as a result of the hydrolysis of the chloroaliphatic carboxylic acid salt reactant which hydrolyzes to form a glycolic acid as illustrated by the following equation:

A number of other methods for effecting the condensation reaction between alkali metal salts of a phenol and of a chloroaliphatic carboxylic acid have been suggested. Each of them has relied upon the presence of water within the reaction system, and it has heretofore been believed necessary that water be present. Accordingly, it has been considered necessary to resort to procedural expedients to limit the extent of the inevitable hydrolysis. Such expedients have resulted in more complicated operating techniques or increased loading on the reaction, recovery or purification equipment, or both.

An object of the present invention is to provide an improved method for the preparation of aryloxy aliphatic carboxylic acids, and particularly polychlorophenoxyacetic acids.

Another object of the invention is to provide a method for the preparation of aryloxy aliphatic carboxylic acids in improved yield by the reaction of alkali metal salts of a phenol and of a chloroaliphatic carboxylic acid.

A further object is to provide a method for the preparation of aryloxy aliphatic carboxylic acids in improved yield and containing little or no organic impurities whose removal necessitates expensive and complicated purification.

Other objects will become apparent from the following description and accompanying drawing.

In accordance with the present invention, alkali metal aryloxy aliphatic carboxylates are produced by reacting alkali metal salts of a chloroaliphatic carboxylic acid and of a phenol in the substantial absence of water. In order to maintain fluidity throughout the course of the reaction, such reaction is carried out in a medium comprising an inert organic liquid. Although reaction under completely anhydrous conditions is desired, it is recognized that it is sometimes difficult to obtain absolutely complete dehydration of the reactants and reaction medium, and hence, minute quantities of water may be present during the reaction.

When starting with a free phenol as reactant, the phenol is reacted with an alkali in a reaction medium comprising an inert organic liquid. The reaction product comprising an alkali metal phenate is distilled to remove substantially all of the water present as vapor, or when the organic liquid forms an azeotrope, as such. The alkali metal phenate is then reacted with an alkali metal salt of a chloroaliphatic carboxylic acid in the presence of the organic liquid and in the substantial absence of water to produce an alkali metal salt of an aryloxy aliphatic carboxylic acid. Upon acidification, the latter salt is converted to an aryloxy aliphatic carboxylic acid.

The process of the invention is highly advantageous since it permits production of the desired aryloxy aliphatic carboxylic acids in improved yield, even from reaction mixtures which contain approximately stoichiometric quantities of the phenolic and acidic reactants.

We have further found that by use of a reaction medium comprising an alcohol having at least one hydrogen atom attached to its OH-carrying carbon atom, i. e., a primary or secondary alcohol, the aryloxy aliphatic carboxylic acid may be produced in improved yield and of such purity that further purification is obviated or simplified. Such alcohols have been found to have a high solvent power for alkali metal phenates and very low solubility for alkali metal salts of aryloxy aliphatic carboxylic acids, and hence act as selective solvents to remove unreacted alkali metal phenate from the reaction product. In accordance with this aspect of the invention, alkali metal salts of a phenol and of a chloroaliphatic carboxylic acid are reacted in a reaction medium comprising a primary and/or secondary alcohol to form an alkali metal salt of an aryloxy aliphatic carboxylic acid. After reaction is complete, the alkali metal salt of the aryloxy aliphatic carboxylic acid is separated from the alcohol which contains any unreacted alkali metal phenate. Following separation, the alkali metal salt of the aryloxy aliphatic carboxylic acid is acidified to form its corresponding aryloxy aliphatic carboxylic acid which may be directly utilized without subjecting it to complicated and expensive purification procedures. The alcohol solution of unreacted alkali metal phenate may be recycled as such to the condensation step of the process, or the alcohol may be recovered in any convenient manner. For example, the alcohol solution may be distilled in the presence of water to remove the alcohol in the form of its azeotrope with water. Upon acidification of the residual product, two layers are formed, an aqueous layer and an organic layer containing crude phenolic compound which may then be recycled to the condensation step of the process.

The temperature of the condensation reaction of the invention ranges from 100° to 180° C. dependent upon the reactants, the reaction medium and the pressure conditions. It is preferred to use as high a temperature as possible in order to effect rapid reaction. The reaction is preferably carried out under atmospheric pressure in the presence of a reaction medium comprising an inert organic liquid which boils above 100° C. If it is desired to employ an organic liquid of lower boiling point, the pressure must be increased in order to attain higher reaction temperatures.

The mol ratios of phenolic to acidic reactants are preferably at least approximately stoichiometric. However, it has been found suitable to employ about 0.9 to 1.25 mols of phenolic reactant per mol of acidic reactant. When the reaction medium comprises a primary and/or secondary alcohol, which have a high and selective solvent power for unreacted alkali metal phenate, it is preferred to employ higher phenol to acid mol ratios than stoichiometric quantities. The amount of organic liquid employed is generally substantially greater than and may range from 2 to 6 times by weight of the phenolic and acidic reactants.

Although the invention applies particularly to the production of polychlorophenoxyacetic acids, it may be used to produce other aryloxy aliphatic carboxylic acids. For example, any alkali metal phenate may be used as reactant. Examples of the alkali metal phenates are alkali metal salts of phenol, 2,4-dichlorophenol, 2,4,5-trichlorophenol, $\alpha$-naphthol, $\beta$-naphthol, 4-chloro-o-cresol and p-chlorophenol.

Examples of suitable alkali metal salts of chloroaliphatic carboxylic acids for use as reactants are alkali metal salts of chloroacetic acid, $\alpha$-chloro-propionic acid and $\alpha$-chlorobutyric acid.

While the sodium salts of the phenolic and acidic compounds are preferred because of cheapness and availability, other alkali metal salts such as potassium and lithium may also be successfully used.

With respect to the alkali for forming alkali metal salts of the phenolic reactants, alkali metal hydroxides such as sodium and potassium hydroxide are preferred. Other alkalies, e. g. sodium carbonate and potassium carbonate, may also be used.

As for the reaction medium, the organic liquid should be chemically inert to the reactants under the reaction conditions. It should exhibit low solubility for alkali metal salts of aryloxy aliphatic carboxylic acids and preferably a high solvent power for alkali metal phenates. Further, according to certain embodiments of the present invention, the organic liquid may be substantially water-insoluble so that its separation from water is facilitated during subsequent recovery procedures. In addition, as stated above, it is preferred that the organic liquid have a boiling point above 100° C. Examples of particularly effective organic liquids are primary and secondary alcohols such as n-amyl alcohol, n-butyl alcohol, n-hexyl alcohol, isoamyl alcohol, 2-ethylhexanol, ethylene glycol, methyl propyl carbinol, propylene glycol and diethylene glycol; as well as Pentasol (a proprietary mixture of primary and secondary amyl alcohols) and refined fusel oil which contains a high percentage of primary amyl alcohols. Other suitable organic liquids include di-isobutyl ketone, di-butyl ether, anisole, o-dichlorobenzene and trichlorobenzene.

The accompanying drawing is a diagrammatic flow sheet illustrating one method of practicing the invention. Referring to the drawing, 2,4,5-trichlorophenol, part of which may be recycled 2,4,5-trichlorophenol, recycled primary amyl alcohol and aqueous sodium hydroxide solution are charged to neutralization chamber 1 through lines 2, 3 and 4, respectively. The charge is reacted at a temperature of about 90° to 140° C., and the introduced water and water of neutralization are removed through line 5 as an azeotrope with primary amyl alcohol. Such azeotrope boiling at about 95° to 96° C. is passed to dilute amyl alcohol tank 6.

The bottoms of neutralization chamber 1 comprising substantially anhydrous sodium phenate in primary amyl alcohol are passed through line 7 to condensation reactor 8. Anhydrous sodium chloroacetate is added to reactor 8 through line 9, and the charge is reacted at a temperature of about 120° to 140° C. During the course of the reaction sodium hydroxide flakes, if required, may be added through line 10 to reactor 8. If small quantities of water, contained, for example, in imperfectly dehydrated charging materials, are introduced into reactor 8, such water may be vented therefrom as a vapor fraction, for example, as an azeotrope with the organic liquid medium, to insure maintenance of the desired anhydrous conditions.

Upon completion of the reaction, the reaction product is cooled to precipitate out sodium 2,4,5-trichlorophenoxyacetate and sodium chloride. The product is then passed through line 12 to filter press 13 where the sodium 2,4,5-trichlorophenoxyacetate and sodium chloride are filtered off and washed with additional primary amyl alcohol which is introduced into filter press 13 through line 14. The filter cake is passed to amyl alcohol recovery chamber 15 through line 16 where it is slurried with water introduced into chamber 15 through line 17 and aqueous solution from tank 6 which is introduced into tank 15 through line 18. Entrained alcohol is azeotropically distilled off as an azeotrope with water boiling at about 95° to 96° C. and passes through line 19 to amyl alcohol storage tank 20.

The bottoms from chamber 15 are passed through line 21 to decolorizing carbon treater 22 into which are introduced Darco (a proprietary decolorizing activated carbon) and water through lines 23 and 24, respectively. After digestion of the Darco-treated mixture at about 80° to 100° C. for a short time, it is passed through line 25 to filter press 26 where sludge containing wet Darco is filtered off and washed with hot water introduced to press 26 through line 27. The sludge is removed from press 26 through line 28 and discarded. The filtrate from press 26 passes through line 29 to 2,4,5-trichlorophenoxyacetic acid precipitator 30 into which is introduced an acid such as sulfuric acid through line 31. Following digestion of the acidified mixture for a short time at about 90° to 105° C., it is allowed to cool to precipitate 2,4,5-trichlorophenoxyacetic acid and is passed through line 32 to filter press 33. In filter press 33 the acidified mixture is filtered to remove 2,4,5-trichlorophenoxyacetic acid which is then washed with water introduced to filter press 33 through line 34. The filtrate containing sodium sulfate is removed from press 33 through line 35 and discarded. The wet 2,4,5-trichlorophenoxyacetic acid passes through line 36 to drier 37 where it is dried at about 90° to 110° C. to produce substantially pure dry 2,4,5-trichlorophenoxyacetic acid product.

The filtrate from filter press 13 is passed through line 38 to amyl alcohol filtrate tank 39. From tank 39, part of the filtrate is recycled through lines 40 and 3 to neutralization chamber 1 for reuse in the process, and the remaining filtrate is passed through line 41 to amyl alcohol purification still 42. In still 42 the amyl alcohol is azeotropically distilled with water introduced to still 42 through line 43. Aqueous sodium hydroxide is also introduced to still 42 through line 44 for the purpose of fixing phenolics as alkali salt. The azeotrope boiling off at about 95° to 96° C. passes through line 45 to amyl alcohol storage tank 20. Amyl alcohol from tank 20 is recycled through lines 46, 40 and 3 to neutralization chamber 1 for reuse in the process. The bottoms of still 42 are passed through line 47 to crude 2,4,5-trichlorophenol separator 48. Through line 49 an acid such as sulfuric acid is introduced into separator 48 to form an aqueous layer which is removed through line 50 and discarded, and an organic layer containing crude 2,4,5-trichlorophenol which is removed through line 51 and recycled to neutralization chamber 1 via line 2 for reuse in the process.

Although not shown in the drawing, the usual conventional auxiliary equipment common in industry such as stirrers, condensers, coolers, pumps and temperature controls are employed for facilitating the operation of the process of the invention.

While the process has been described as being conducted in a batchwise manner, it will be understood by those skilled in the art that it may also be carried out in a continuous manner.

The following are illustrative examples of the process of the invention. Parts are by weight.

*Example 1.*—153 parts of 99% 2,4,5-trichlorophenol, about 1000 parts of Pentasol (a proprietary mixture of primary and secondary amyl alcohols) and 51 parts of 85% potassium hydroxide pellets dissolved in 48 parts of water were charged to a reactor provided with a condenser and an agitator. The mixture was refluxed at a temperature of 95° to 130° C. for 2¾ hours. During the reaction the water present in the mixture distilled out as an azeotrope with Pentasol. After addition of 97.8 parts of 95% anhydrous sodium chloroacetate, the mixture was refluxed at a temperature of 125° to 130° C. After 1 hour's refluxing, 5 parts of 85% potassium hydroxide pellets was added to the mixture, and refluxing was continued for an additional hour. Upon allowing the reaction product to cool, crude sodium 2,4,5-trichlorophenoxyacetate precipitated out, was filtered and washed with 320 parts of Pentasol.

The wet cake resulting from the aforementioned filtration was slurried with about 1750 parts of water, and the resulting slurry was distilled at a temperature of 95° to 110° C. to remove entrained Pentasol as an azeotrope with water. To the distilland were added 3389 parts of water and 11 parts of Darco. After digestion for 30 minutes at 90° C., the mixture was filtered. To the filtrate was added 88 parts of 93.2% sulfuric acid over a period of 30 minutes, maintaining the filtrate at 90° C. Upon allowing the filtrate to cool, 2,4,5-trichlorophenoxyacetic acid precipitated out, was filtered and then dried at 80° C. The resulting product constituted 175 parts of substantially pure 2,4,5-trichlorophenoxyacetic acid, which represented a yield of 89.3% based on the 2,4,5-trichlorophenol charged and 85.9% based on the sodium chloroacetate charged.

The filtrate removed from the crude sodium 2,4,5-trichlorophenoxyacetate comprised Pentasol and unreacted sodium 2,4,5-trichlorophenate. To this filtrate were added 3 parts of 85% potassium hydroxide pellets in 3 parts of water and, in addition, 450 parts of water. The mixture was heated at 95° to 105° C. to remove the Pentasol as an azeotrope with water. The Pentasol so removed was recycled to the reactor for reuse in the next run. When the Pentasol had been removed, the aqueous residue contained a heavy oil layer which solidified upon cooling. The aqueous residue was heated to 80° C., with agitation, and 20 parts of 95% sulfuric acid was added over a period of 30 minutes. The solid material dissolved, and an oil comprising crude 2,4,5-trichlorophenol separated out. To the acidified mixture was added 25 parts of water, and the oil constituting 15 parts was removed and recycled to the reactor for reuse in the next run.

In place of the Pentasol used in the above example, other primary and/or secondary alcohols such as 2-ethylhexanol, n-hexanol, methyl propyl carbinol and n-amyl alcohol may be employed.

*Example 2.*—416 parts of 95% 2,4,5-trichlorophenol, 1239 parts of isoamyl alcohol and 139 parts of 85% potassium hydroxide pellets dissolved in 100 parts of water were charged to a reactor provided with a condenser and an agitator. The mixture was refluxed for 9 hours at 104° C. to 126° C., the water present being distilled out as an azeotrope with isoamyl alcohol. 245 parts of 95% anhydrous sodium chloroacetate together with 165.2 parts of isoamyl alcohol was added to the mixture which was then refluxed at 120° to 122° C. After about 30 minutes refluxing, 7 parts of 85% potassium hydroxide pellets was added, and refluxing was continued for 1 hour. The reaction product containing crude sodium 2,4,5-trichlorophenoxyacetate was cooled to 36° C., filtered and washed with 991.2 parts of isoamyl alcohol.

The resulting wet cake comprising crude sodium 2,4,5-trichlorophenoxyacetate was slurried with 5000 parts of water and heated to 70° C. to form a solution. Upon heating the solution at 98° to 104° C., entrained isoamyl alcohol was distilled out as an azeotrope with water. 3000 parts hot water (90° C.) and 25 parts of Darco were then added, and the mixture was digested at 80°–100° C. for 45 minutes. Following addition of 1000 parts of hot water, the mixture was filtered, and the cake was washed with 2000 parts of hot water. After heating the filtrate to 90° C., it was acidified with 235 parts of 95% sulfuric acid over a period of 1 hour at 90° to 100° C. The acidified mixture was then digested at 100°–104° C. for one hour and allowed to cool to separate out 2,4,5-trichlorophenoxyacetic acid. The acid product after filtration and drying at 110° C. constituted 431.7 parts which represented an 84.5% yield based on either of the reactants charged.

The filtrate removed from the crude sodium 2,4,5-trichlorophenoxyacetate comprised isoamyl alcohol and unreacted sodium 2,4,5-trichlorophenate. This filtrate was distilled with water to remove the isoamyl alcohol as an azeotrope with water, and the aqueous residue was acidified with concentrated hydrochloric acid to separate an oil which constituted 43.2 parts of crude 2,4,5-trichlorophenol.

*Example 3.*—163 parts of 2,4-dichlorophenol was dissolved in 370 parts of di-isobutyl ketone in a reactor provided with a condenser and an agitator. 41.7 parts of sodium hydroxide in 50 parts of water was added, and the mixture was refluxed until all the water present in the mixture distilled out as an azeotrope with di-isobutyl ketone, the final temperature being 185° to 186° C. 47.2 parts of chloroacetic acid was dissolved in di-isobutyl ketone removed from the water azeotrope and was slowly added to the reaction mixture. The reaction mixture was then refluxed for 3 hours at 175° to 176° C. The reaction product containing sodium 2,4-dichlorophenoxyacetate was cooled to 90° C. and washed successively with 100, 250 and 100 parts of water which dissolved the 2,4-dichlorophenoxyacetate but comparatively little di-isobutyl ketone or 2,4-dichlorophenol. The combined aqueous extracts were boiled briefly at about 100° C. to remove small amounts of entrapped ketone and were then cooled to 60° C. whereupon the sodium 2,4-dichlorophenoxyacetate crystallized out. 105 parts of 36% aqueous hydrochloric solution was added to the crystallized salt to liberate 2,4-dichlorophenoxyacetic acid which was recovered by filtration. The acid product, after drying at 110° C., constituted 100.1 parts which represented a yield of 90.7% based on the acid charged.

*Example 4.*—93.8 parts of 100% 2,4-dichlorophenol, 600 parts of trichlorobenzene and 24 parts of sodium hydroxide in 40 parts of water were charged to a reactor. The mixture was refluxed for 1.5 hours at 150°–90° C. at 760 to 300 mm. Hg pressure (the pressure being reduced according to temperature), the water present being distilled out as an azeotrope with trichlorobenzene. 61.3 parts of 95% anhydrous sodium chloroacetate was added to the mixture which was then refluxed for 1½ hours at 150°–160° C.

The reaction mixture containing sodium 2,4-dichlorophenoxyacetate was extracted with 600 parts of hot water (95° C.) containing 2 parts of sodium hydroxide thereby forming two layers, a lower oil layer and an upper aqueous layer. The oil layer comprising trichlorobenzene was withdrawn from the aqueous layer comprising sodium 2,4-dichlorophenoxyacetate. The aqueous layer was distilled at 95° to 100° C. to remove entrained trichlorobenzene as an azeotrope with water. The aqueous solution was then cooled to 95° C., and 20 parts of sodium chloride was added to the solution, thereby forming a slurry of sodium 2,4-dichlorophenoxyacetate. After cooling the slurry overnight to 15° C., the sodium 2,4-dichlorophenoxyacetate was filtered off. The resulting cake was then dissolved in 800 parts of water and heated at 100° C. for 30 minutes with Darco. The resulting solution was filtered and acidified with 55 parts of 95% $H_2SO_4$. The 2,4-dichlorophenoxyacetic acid precipitated out, was filtered and then dried at 110° C. The final 2,4-dichlorophenoxyacetic acid product constituted 98 parts which represented a yield of 88.7% based on the sodium chloroacetate charged.

From the foregoing description and examples, numerous advantages of the instant invention are obvious. The yield of aryloxy aliphatic carboxylic acid is excellent, even when approximately stoichiometric quantities of the reactants are employed. Hydrolysis of chloroaliphatic carboxylic acid is substantially eliminated by carrying out the reaction in the substantial absence of water. By use of an organic liquid comprising a primary and/or secondary alcohol as reaction medium, unreacted phenate is easily separated and the resulting product is substantially pure, thereby eliminating the necessity for complex and expensive purification procedures. To minimize its cost, the organic liquid may be recycled.

The description and examples are intended to be illustrative only. Any modification of or variation therefrom which conforms to the spirit of the invention is intended to be included within the scope of the claims.

We claim:

1. The process of preparing a chlorophenoxy aliphatic carboxylic acid which comprises reacting alkali metal salts of a chloroaliphatic carboxylic acid and of a chlorophenol in a reaction medium comprising an inert organic liquid of the group consisting of primary and secondary alcohols having boiling points above 100° C., di-isobutyl ketone, di-butyl ether, anisole, o-dichlorobenzene and trichlorobenzene and in the substantial absence of water, and acidifying the resulting reaction product to form a chlorophenoxy aliphatic carboxylic acid.

2. The process of preparing a polychlorophenoxyacetic acid which comprises reacting alkali metal salts of chloroacetic acid and of a polychlorophenol in a reaction medium comprising an inert organic liquid of the group consisting of primary and secondary alcohols having boiling points above 100° C., di-isobutyl ketone, di-butyl ether, anisole, o-dichlorobenzene and trichlorobenzene and in the substantial absence of water, and acidifying the resulting reaction product to form a polychlorophenoxyacetic acid.

3. The process of preparing 2,4-dichlorophenoxyacetic acid which comprises reacting alkali metal salts of chloroacetic acid and of 2,4-dichlorophenol in a reaction medium comprising an inert organic liquid of the group consisting of primary and secondary alcohols having boiling points above 100° C., di-isobutyl ketone, di-butyl ether, anisole, o-dichlorobenzene and trichlorobenzene and in the substantial absence of water, and acidifying the resulting reaction product to form 2,4-dichlorophenoxyacetic acid.

4. The process of preparing 2,4,5-trichlorophenoxyacetic acid which comprises reacting alkali metal salts of chloroacetic acid and of 2,4,5-trichlorophenol in a reaction medium comprising an inert organic liquid of the group consisting of primary and secondary alcohols having boiling points above 100° C., di-isobutyl ketone, di-butyl ether, anisole, o-dichlorobenzene and trichlorobenzene and in the substantial absence of water, and acidifying the resulting reaction product to form 2,4,5-trichlorophenoxyacetic acid.

5. The process of preparing a substantially pure polychlorophenoxyacetic acid which comprises reacting alkali metal salts of chloroacetic acid and of a polychlorophenol in a reaction medium comprising an alcohol having at least one hydrogen atom attached to its OH-carrying carbon atom, said alcohol having a boiling point above 100° C., and in the substantial absence of water to precipitate alkali metal polychlorophenoxyacetate, separating the precipitated alkali metal polychlorophenoxyacetate from the alcohol containing unreacted alkali metal polychlorophenate, acidifying the alkali metal polychlorophenoxyacetate to precipitate a polychlorophenoxyacetic acid, and separating said precipitated polychlorophenoxyacetic acid from the acidified product.

6. The process of preparing a polychlorophenoxyacetic acid which comprises reacting a polychlorophenol with an alkali in a reaction medium comprising an alcohol having at least one hydrogen atom attached to its OH-carrying carbon atom, said alcohol having a boiling point above 100° C., distilling the reaction product to remove substantially all of the water present in the form of an azeotrope with the alcohol, reacting the resulting alkali metal polychlorophenate in the presence of the alcohol and in the substantial absence of water with an alkali metal salt of chloroacetic acid, and acidifying the resulting reaction product to form a polychlorophenoxyacetic acid.

7. The process of preparing 2,4-dichlorophenoxyacetic acid which comprises reacting 2,4-dichlorophenol with an alkali in a reaction medium comprising a primary alcohol having a boiling point above 100° C., distilling the reaction product to remove substantially all of the water present in the form of an azeotrope with the alcohol, reacting the resulting alkali metal 2,4-dichlorophenate in the presence of the primary alcohol and in the substantial absence of water with an alkali metal salt of chloroacetic acid to precipitate alkali metal 2,4-dichlorophenoxyacetate, separating the precipitated alkali metal 2,4-dichlorophenoxyacetate from the alcohol containing unreacted alkali metal 2,4-dichlorophenate, acidifying the alkali metal 2,4-dichlorophenoxyacetate to precipitate 2,4-dichlorophenoxyacetic acid, and separating said precipitated 2,4-dichlorophenoxyacetic acid from the acidified product.

8. The process of preparing 2,4,5-trichlorophenoxyacetic acid which comprises reacting 2,4,5-trichlorophenol with an alkali in a reaction medium comprising a primary alcohol having a boiling point above 100° C., distilling the reaction product to remove substantially all of the water present in the form of an azeotrope with the alcohol, reacting the resulting alkali metal 2,4,5-trichlorophenate in the presence of the primary alcohol and in the substantial absence of water with an alkali metal salt of chloroacetic acid to precipitate alkali metal 2,4,5-trichlorophenoxyacetate, separating the precipitated alkali metal 2,4,5-trichlorophenoxyacetate from the alcohol containing unreacted alkali metal 2,4,5-trichlorophenate, acidifying the alkali metal 2,4,5-trichlorophenoxyacetate to precipitate 2,4,5-trichlorophenoxyacetic acid, and separating said precipitated 2,4,5-trichlorophenoxyacetic acid from the acidified product.

9. The process of claim 7 in which the primary alcohol comprises an amyl alcohol.

10. The process of claim 8 in which the primary alcohol comprises an amyl alcohol.

References Cited in the file of this patent

UNITED STATES PATENTS

| | | |
|---|---|---|
| 2,480,817 | Warren | Aug. 30, 1949 |
| 2,656,382 | Kulza et al. | Oct. 20, 1953 |

OTHER REFERENCES

Thompson et al.: Chem. Absts., 41, pp. 3902–3912 (1947).